(12) United States Patent
Eom

(10) Patent No.: US 7,286,452 B2
(45) Date of Patent: Oct. 23, 2007

(54) APPARATUS AND METHOD FOR DETECTING SYNCHRONIZATION OF ADDRESS IN PRE-GROOVE FOR OPTICAL STORAGE DEVICE

(75) Inventor: Woo-sik Eom, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 632 days.

(21) Appl. No.: 10/771,502

(22) Filed: Feb. 5, 2004

(65) Prior Publication Data
US 2004/0240343 A1   Dec. 2, 2004

(30) Foreign Application Priority Data
Feb. 5, 2003   (KR) .............. 10-2003-0007114

(51) Int. Cl.
G11B 7/005   (2006.01)
(52) U.S. Cl. .............. 369/47.22; 369/53.34; 369/47.28; 369/47.31; 369/47.48
(58) Field of Classification Search ............ 369/53.34, 369/47.22, 47.28, 47.31, 47.35, 47.39, 47.48
See application file for complete search history.

(56) References Cited

U.S. PATENT DOCUMENTS

| | | | |
|---|---|---|---|
| 5,661,708 A * | 8/1997 | Yamawaki | 369/47.22 |
| 6,172,947 B1 * | 1/2001 | Senshu | 369/53.35 |
| 6,536,011 B1 * | 3/2003 | Jang et al. | 714/814 |
| 6,538,982 B1 * | 3/2003 | Van Vlerken et al. | 369/275.4 |
| 6,952,381 B2 * | 10/2005 | Schep et al. | 369/44.13 |
| 2003/0128640 A1 * | 7/2003 | Schep et al. | 369/47.31 |

* cited by examiner

Primary Examiner—Wayne Young
Assistant Examiner—Thomas Alunkal
(74) Attorney, Agent, or Firm—Staas & Halsey LLP

(57) ABSTRACT

An apparatus and method detecting synchronization of address in pre-groove (ADIP), allowing an optical storage device to write data to an accurate location of a disc includes a bit synchronization detecting unit and a word synchronization detecting unit. The bit synchronization detecting unit determines synchronization of bits of the ADIP to be in a bit synchronization locked state when synchronization of raw bits is detected within a bit synchronization window having a first predetermined period a first predetermined number of consecutive times. The word synchronization detecting unit determines synchronization of words of the ADIP to be in a word synchronization locked state when synchronization of raw words is detected within a word synchronization window having a second predetermined period the first predetermined number of consecutive times.

38 Claims, 10 Drawing Sheets

APPARATUS AND METHOD FOR DETECTING SYNCHRONIZATION OF ADDRESS IN PRE-GROOVE FOR OPTICAL STORAGE DEVICE

CROSS-REFERENCE TO RELATED APPLICATIONS

This application claims the priority of Korean Patent Application No. 2003-7114, filed on Feb. 5, 2003, in the Korean Intellectual Property Office, the disclosure of which is hereby incorporated by reference in its entirety.

BACKGROUND OF THE INVENTION

1. Field of the Invention

The present invention relates to an optical storage device capable of recording data on discs such as CD-Recordable discs (CD-R), CD-Rewritable discs (CD-RW), Digital Versatile Disc+Recordable discs (DVD+R), and Digital Versatile Disc+Rewritable discs (DVD+RW), and more particularly, to an apparatus and method for detecting synchronization of address in pre-groove (ADIP), by which an optical storage device can write data to an accurate location of a disc.

2. Description of the Related Art

With the increasing demand for optical discs, large-sized and inconvenient laser discs (LDs) have been improved over time and DVDs have been developed to enhance video features of the LDs. Recently, DVDs have been developed into readable and recordable optical discs such as DVD-Recordable discs (DVD-R), DVD-Random Access Memories (DVD-RAM), DVD-Rewritable discs (DVD-RW), DVD+R, and DVD+RW. Such improvements have already come into practical use.

In general, the structural characteristics of optical storage devices, which record data on optical discs, vary depending on the types of optical discs used by the optical storage devices. However, it is common practice for the optical storage devices to detect an ADIP that has been previously recorded on a disc during disc manufacturing, so as to write data to and read data from an accurate location of the disc.

Therefore, there is an urgent need for accurate detection of the ADIP, to allow the optical storage devices to write data to and read data from an accurate location of the disc.

SUMMARY OF THE INVENTION

The present invention provides an apparatus and method detecting synchronization of address in pre-groove (ADIP), which allow an optical storage device to write data to an accurate location of an optical disc by efficiently detecting synchronization of ADIP.

According to one aspect of the present invention, there is provided an apparatus detecting synchronization of address in pre-groove (ADIP) that includes a bit synchronization detecting unit and a word synchronization detecting unit. The bit synchronization detecting unit determines synchronization of bits of the ADIP to be in a bit synchronization locked state when raw-bit-sync is detected a first predetermined number of consecutive times within a bit synchronization window having a first predetermined period. The word synchronization detecting unit determines synchronization of words of the ADIP to be in a word synchronization locked state when raw-word-sync is detected the first predetermined number of consecutive times within a word synchronization window having a second predetermined period.

Additional aspects and/or advantages of the invention will be set forth in part in the description which follows and, in part, will be obvious from the description, or may be learned by practice of the invention.

According to another aspect of the present invention, there is provided a method for detecting synchronization of address in pre-groove (ADIP) including determining synchronization of bits of the ADIP to be in a bit synchronization locked state when raw-bit-sync is detected within a bit synchronization window having a first predetermined period a first predetermined number of consecutive times, and if synchronization of the bits of the ADIP is in a bit synchronization unlocked state, determining synchronization of words of the ADIP to be in a word synchronization locked state when raw-word-sync is detected within a word synchronization window having a second predetermined period the first predetermined number of consecutive times.

According to still another aspect of the present invention, there is provided a method detecting synchronization of address in pre-groove (ADIP). The method includes detecting raw-bit-sync, setting a count value of a first counter, which controls a location of a bit synchronization window, to a predetermined value during detection of synchronization of the raw bits, determining synchronization of the bits of the ADIP to be in a bit synchronization locked state when raw-bit-sync is detected within the bit synchronization window a first predetermined number of consecutive times, changing the bit synchronization locked state to a bit synchronization unlocked state when non-raw-bit-sync is detected in the bit synchronization locked state a second predetermined number of consecutive times, detecting raw-word-sync in the bit synchronization locked state, during detection of synchronization of the raw words, setting the count value of the first counter and a count value of a second counter, which are used to control a location of a word synchronization window, to predetermined values, determining synchronization of the bits of the ADIP to be in the bit synchronization locked state and synchronization of the words of the ADIP to be in the word synchronization locked state when raw-word-sync is detected within the word synchronization window in the bit synchronization locked state the first predetermined number of consecutive times, and changing the state of the synchronization of the words of the ADIP from the word synchronization locked state to a word synchronization unlocked state and changing the state of the synchronization of the bits of the ADIP from the bit synchronization locked state to the bit synchronization unlocked state when non-raw-word-sync is detected in the word synchronization locked state the second predetermined number of consecutive times.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
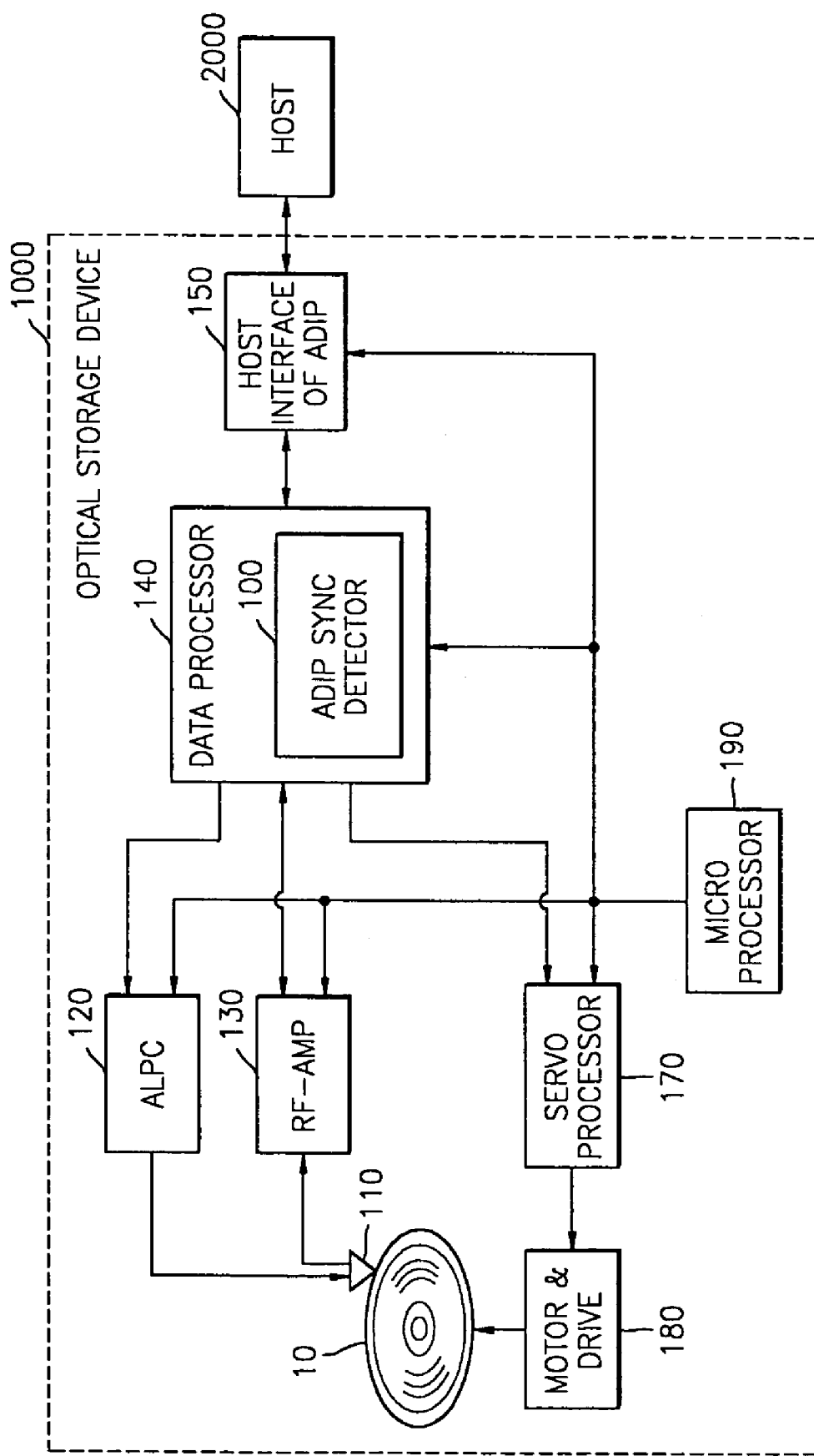
FIG. 1 is a block diagram of an optical storage device according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an optical storage device 1000 according to an embodiment of the present invention. Referring to FIG. 1, the optical storage device 1000 includes an optical pickup 110, an auto laser power control (ALPC) 120, a radio frequency-amplifier (RF-AMP) 130, a data processor 140, a host interface 150, a motor & driver 180, a servo processor 170, and a microprocessor 190.

The optical pickup 110 reads signals based on light beams reflected off an optical disc 10. The ALPC 120 controls the amount of light radiated from a laser of the optical pickup 110. The RF-AMP 130 amplifies signals output from the optical pickup 110. The motor & driver 180 includes a motor that rotates the optical disc 10 according to a motor driver. The servo processor 170 is coupled to the motor & driver 180 and performs motor control, tracking, and focus control that are associated with driving the optical disc 10. The data processor 140 includes an ADIP sync detector 100, thus detecting synchronization of an ADIP signal and inserting and protecting sync signals. Also, the data processor 140 generates control signals for demodulation/modulation, error correction, and the RF-AMP 130. The host interface 150 acts as an interface between the optical storage device 1000 and a host 2000. The microprocessor 190 controls the overall operation of the optical storage device 1000.

Figure 2:
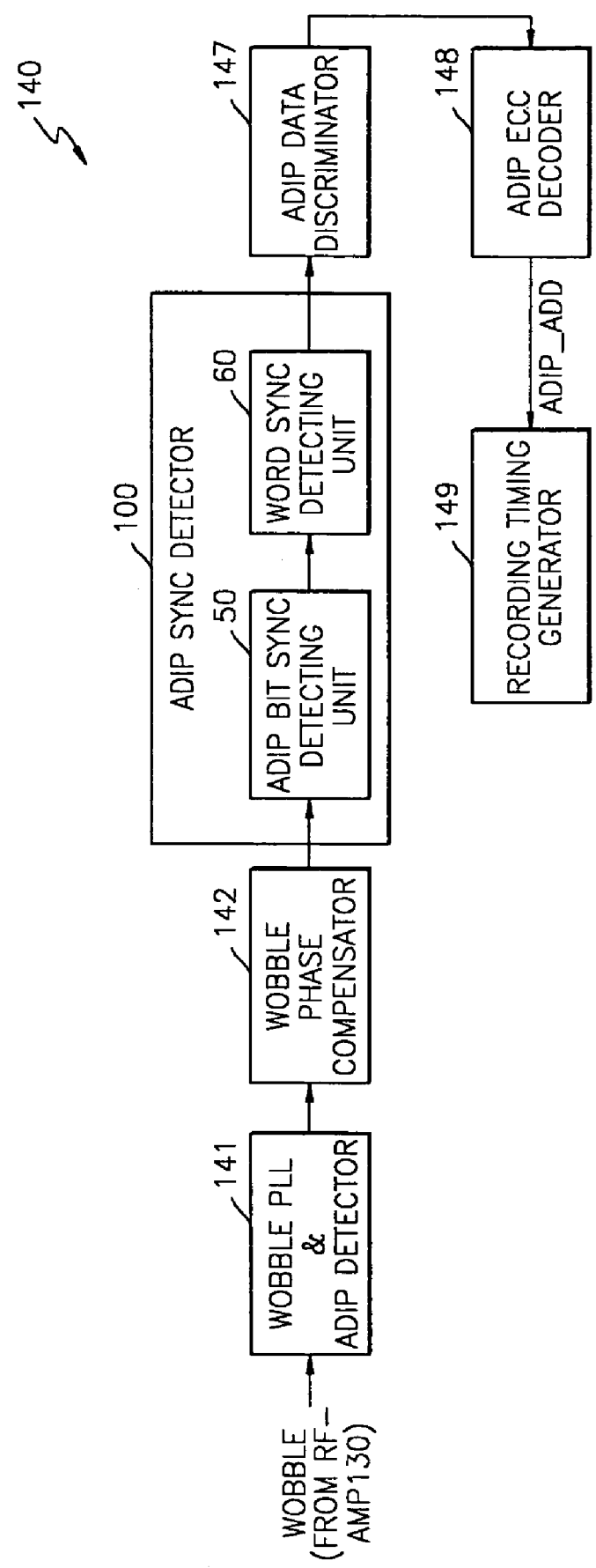
FIG. 2 is a block diagram of a data processor of FIG. 1.

FIG. 2 is a block diagram of the data processor 140 of FIG. 1. Referring to FIG. 2, the data processor 140 includes a wobble phase-locked loop (PLL) & ADIP detector 141, a wobble phase compensator 142, the ADIP sync detector 100, an ADIP data discriminator 147, an ADIP error correction code (ECC) decoder 148, and a recording timing generator 149.

The wobble PLL & ADIP detector 141 includes a wobble PLL and an ADIP detector. The wobble PLL & ADIP detector 141 removes jitter components and defects from a wobble signal WOBBLE output from the RF-AMP 130 after completion of resetting or initialization, and then generates a wobble sync signal PWB, a wobble clock signal WBCLK, and an ADIP signal containing ADIP information. Here the wobble sync signal PWB is phase-locked to have a frequency equal to a natural frequency of the wobble signal WOBBLE. The wobble clock signal WBCLK is used for a data write operation and has a frequency that is 32 times the natural frequency of the wobble signal WOBBLE. The wobble phase compensator 142 operates in such a way as to establish a predetermined relationship among the beginning location of an actual block on the optical disc 10, the wobble sync signal PWB, and the ADIP signal. This operation of the wobble phase compensator 142 compensates for delays in signals due to the use of filters in wobble detection.

The ADIP sync detector 100 includes an ADIP bit sync detecting unit 50 and an ADIP word sync detecting unit 60. The ADIP bit sync detecting unit 50 detects ADIP sync of bits (ADIP bit sync) corresponding to 1 wobble. More specifically, the ADIP bit sync detecting unit 50 detects an accurate location, from among 93 wobbles, of the ADIP signal and prevents a bit sync pattern that is detected at an incorrect location from being detected as actual ADIP bit sync. Also, when bit sync is not detected from a correct location due to defects of the optical disc 10 or for other reasons, the ADIP bit sync detecting unit 50 recovers the correct ADIP bit sync. The ADIP word sync detecting unit 60 detects and recovers ADIP sync of words (ADIP word sync), wherein such ADIP word sync occurs at every $52^{nd}$ occurrence of ADIP bit sync. Here, ADIP word sync is processed during processing of ADIP bit sync. The detailed structure of the ADIP sync detector 100 will be described with reference to FIG. 3.

The ADIP data discriminator 147 determines whether ADIP data has a value of 0 or 1 and transmits the result to the ADIP ECC decoder 148. When there is an error in the detected ADIP data, the ADIP ECC decoder 148 performs error correction using an ADIP bit sync pattern and an ADIP word sync pattern that are detected in the ADIP sync detector 100. Also, the ADIP ECC decoder 148 transmits address information ADIP_ADD of the ADIP signal to the recording timing generating generator 149. The recording timing generator 149 controls the timing of recording data on the optical disc 10 in response to the address information ADIP_ADD of the ADIP signal transmitted from the ADIP ECC decoder 148.

Figure 3:
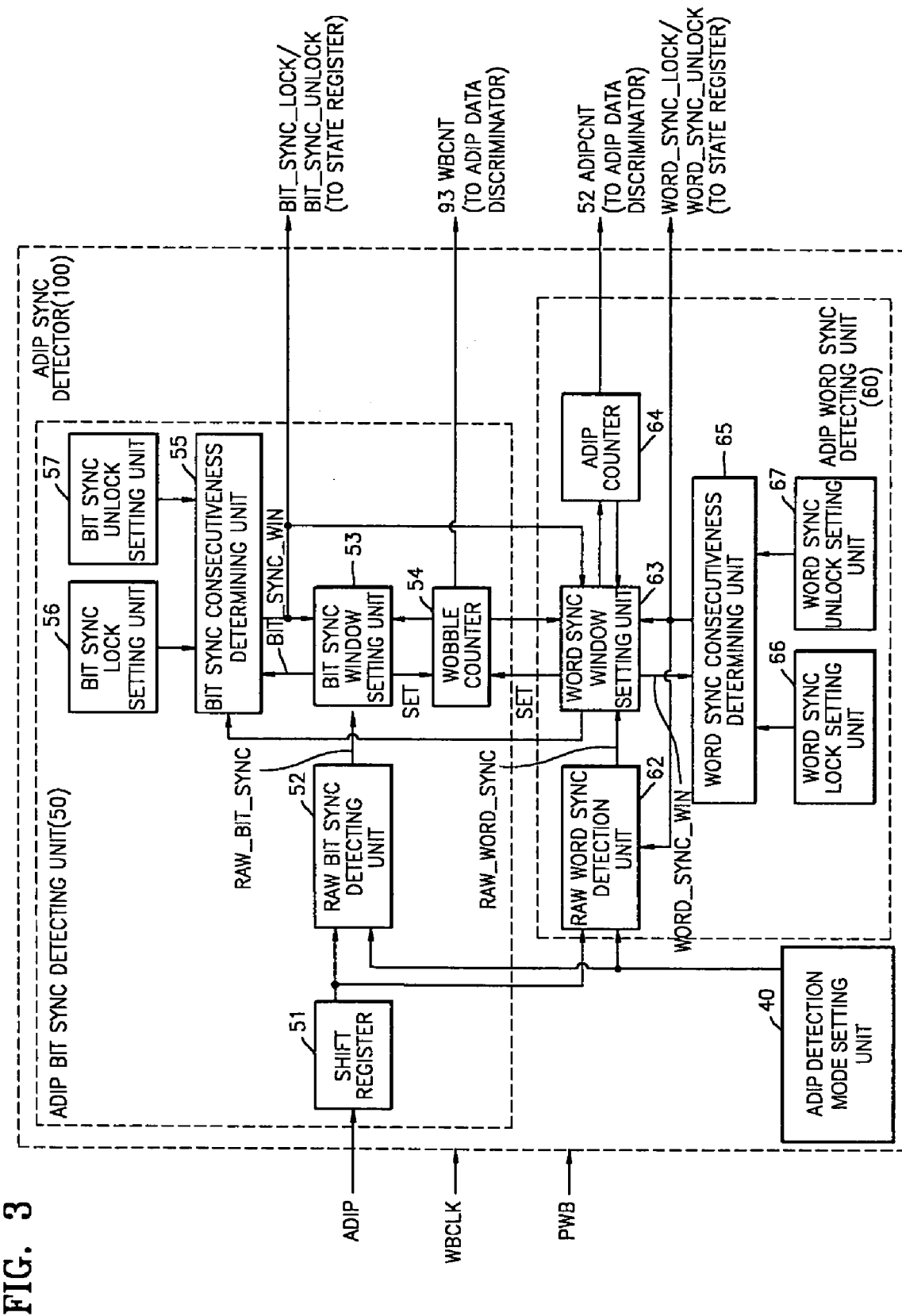
FIG. 3 is a block diagram of the ADIP sync detector of FIG. 2.
Figure 4:
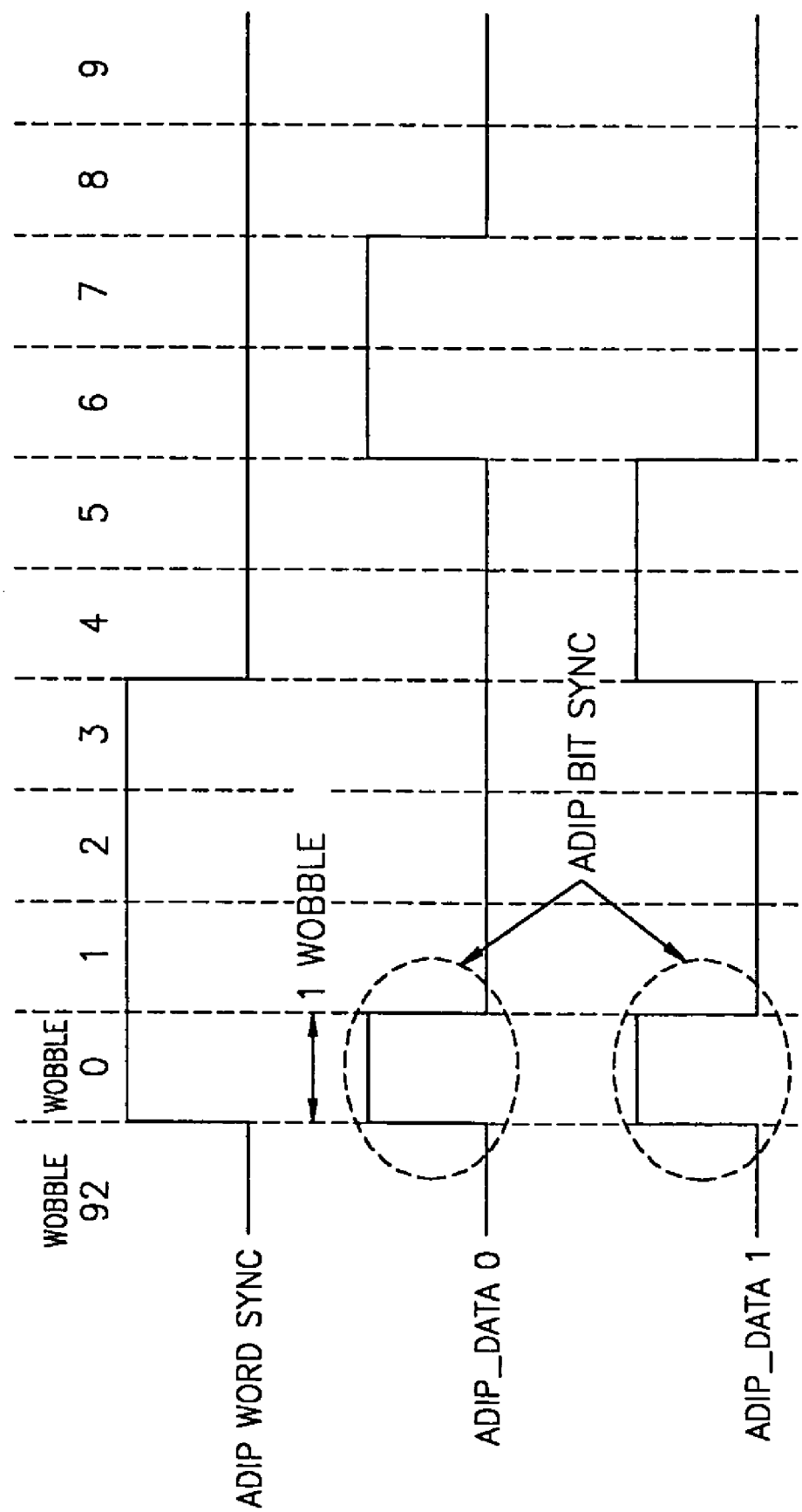
FIG. 4 is a timing diagram of an example ADIP signal.

FIG. 3 is a block diagram of the ADIP sync detector 100 of FIG. 2, and FIG. 4 is a timing diagram for an example of the ADIP signal. Referring to FIG. 3, the ADIP sync detector 100 includes an ADIP detection mode setting unit 40, the ADIP bit sync detecting unit 50, and the ADIP word sync detecting unit 60.

The ADIP detection mode setting unit 40 sets ADIP sync detection modes of the ADIP bit sync detecting unit 50 and the ADIP word sync detecting unit 60. Table 1 shows examples of ADIP sync detection patterns according to ADIP sync detection modes.

TABLE 1

| ADIP sync detection mode | ADIP bit sync detection pattern | ADIP word sync detection pattern | Remarks |
| --- | --- | --- | --- |
| 0: Normal mode | 0100 0001 100 0100 0110 000 | 0111 1000 000 (when ADIP word sync is unlocked) 0111 10XX XXX (when ADIP word sync is locked) | *11 wobbles *When ADIP bit sync or ADIP word sync is detected, a count value of a wobble counter is set to J (e.g., 10). *When ADIP word sync is detected, a count value of |
| 1: Margin mode | 01X0 0001 1X0 01X0 011X 000 | 0111 1X00 000 (when ADIP word sync is unlocked) 0111 1X0X XXX (when ADIP | |

TABLE 1-continued

| ADIP sync detection mode | ADIP bit sync detection pattern | ADIP word sync detection pattern | Remarks |
|---|---|---|---|
| | | word sync is locked) | an ADIP counter is set to K (e.g., 0). |

Referring to Table 1, the ADIP sync detection modes are classified into the normal mode and the margin mode. The normal mode indicates a normal ADIP sync detection mode, and the margin mode has detection patterns that are more flexible than those of the normal mode. Thus, when the ADIP sync detection mode is set to the margin mode, the possibility of detecting ADIP bit sync and ADIP word sync increases compared to the normal mode.

Next, the structures of the ADIP bit sync detecting unit 50 and the ADIP word sync detecting unit 60 will be described.

The ADIP bit sync detecting unit 50 detects ADIP bit sync having the 1 wobble. The ADIP bit sync detecting unit 50 comprises a shift register 51, a raw bit sync detecting unit 52, a bit sync window setting unit 53, a wobble counter 54, a bit sync consecutiveness determining unit 55, a bit sync lock setting unit 56, and a bit sync unlock setting unit 57.

The shift register 51 includes 11 bit shift registers and stores 11 bits of ADIP data The ADIP data stored in the shift register 51 is output to both the raw bit sync detecting unit 52 and a raw word sync detection unit 62 and is then used to detect ADIP bit sync and ADIP word sync, respectively.

The raw bit sync detecting unit 52 detects raw ADIP synchronization of bits (hereinafter, referred to as raw-bit-sync) output from the shift register 51 in response to the ADIP sync detection mode that is set by the ADIP detection mode setting unit 40. The result of the detection of raw-bit-sync by the raw bit sync detecting unit 52 is output to the bit sync window setting unit 53.

The bit sync window setting unit 53 generates and outputs a bit sync window BIT_SYNC_WIN to the bit sync consecutiveness determining unit 55 to determine whether bit sync is locked or unlocked based on whether the result of the detection of raw-bit-sync falls within the bit sync window BIT_SYNC_WIN having a first predetermined period.

The wobble counter 54 is a counter capable of counting up to 93. The wobble counter 54 controls a specific location that is to be determined to be ADIP bit sync in the bit sync window BIT_SYNC_WIN by counting the number of wobbles. The wobble counter 54 is shared and used by both the ADIP bit sync detecting unit 50 and the ADIP word sync detecting unit 60. Thus, as will be described in detail, the wobble counter 54 controls a specific location that is to be determined to be ADIP word sync in a word sync window WORD_SYNC_WIN as well as a specific location that is to be determined as ADIP bit sync in the bit sync window BIT_SYNC_WIN.

The bit sync consecutiveness determining unit 55 determines whether raw-bit-sync is detected a first predetermined number of consecutive times within the bit sync window BIT_SYNC_WIN having the first predetermined period. If raw-bit-sync is detected the first predetermined number of consecutive times, it is determined that ADIP bit sync is locked, and thus, a bit sync lock signal BIT_SYNC_LOCK is generated. If non-raw-bit-sync is detected a second predetermined number of consecutive times during locking of the ADIP bit sync, the ADIP bit sync is converted to the unlocked state, and thus, a bit sync unlock signal BIT_SYNC_UNLOCK is generated.

The bit sync consecutiveness determining unit 55 is coupled to the bit sync lock setting unit 56 and the bit sync unlock setting unit 57, and provides the standards for determining an ADIP bit sync locked state and an ADIP bit sync unlocked state (i.e., the first predetermined number of consecutive times and the second predetermined number of consecutive times on which a determination of whether ADIP bit sync is locked or unlocked is based).

The ADIP word sync detecting unit 60 detects ADIP word sync that occurs whenever ADIP bit sync occurs 52 times consecutively. To this end, the ADIP word sync detecting unit 60 includes the raw word sync detection unit 62, a word sync window setting unit 63, an ADIP counter 64, a word sync consecutiveness determining unit 65, a word sync lock setting unit 66, and a word sync unlock setting unit 67.

The raw word sync detection unit 62 detects raw ADIP synchronization of words (hereafter, referred to as raw-word-sync) output from the shift register 51 in response to the ADIP sync detection mode that is set by the ADIP detection mode setting unit 40. The result of the detection of raw-word-sync by the raw word sync detection unit 62 is output to the word sync window setting unit 63. The word sync window setting unit 63 generates and outputs the word sync window WORD_SYNC_WIN to determine whether ADIP word sync is locked or unlocked based on whether the result of the detection of raw-word-sync falls within a word sync window WORD_SYNC_WIN having a second predetermined period.

The ADIP counter 64 is a counter capable of counting up to 52. The ADIP counter 64 controls a specific location that is to be determined to be ADIP word sync in the word sync window WORD_SYNC_WIN by counting the number of bit syncs. The control of the location in the word sync window WORD_SYNC_WIN is also performed by the wobble counter 54 as well as by the ADIP counter 64.

The word sync consecutiveness determining unit 65 determines whether raw-word-sync is detected a first predetermined number of times consecutively within the word sync window WORD_SYNC_WIN having the second predetermined period. If raw-word-sync is detected the first predetermined number of consecutive times, it is determined that ADIP word sync is locked, and a word sync lock signal WORD_SYNC_LOCK is generated. If non-raw-word-sync is detected a second predetermined number of consecutive times during locking of the ADIP word sync, the ADIP word sync is converted to the unlocked state, and thus, a word sync unlock signal WORD_SYNC_UNLOCK is generated. The word sync consecutiveness determining unit 65 is coupled to the word sync lock setting unit 66 and the word sync unlock setting unit 67 and provides the standards for determining an ADIP word sync locked state and an ADIP word sync unlocked state (i.e., the first predetermined number of consecutive times and the second predetermined number of consecutive times).

Figure 5:
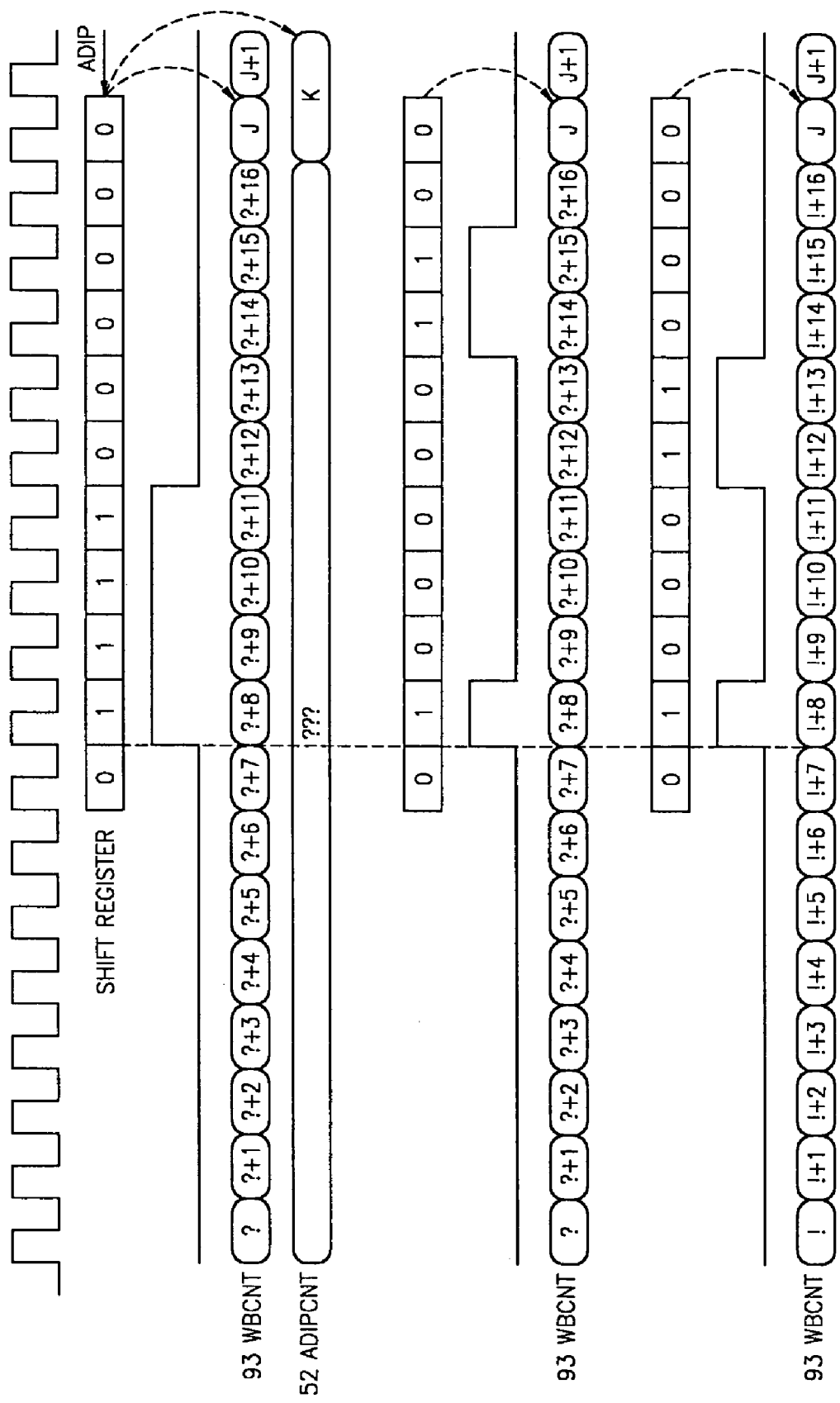
FIG. 5 is a timing diagram for detection of ADIP sync in a normal mode when ADIP word sync and ADIP bit sync are unlocked.
Figure 6:
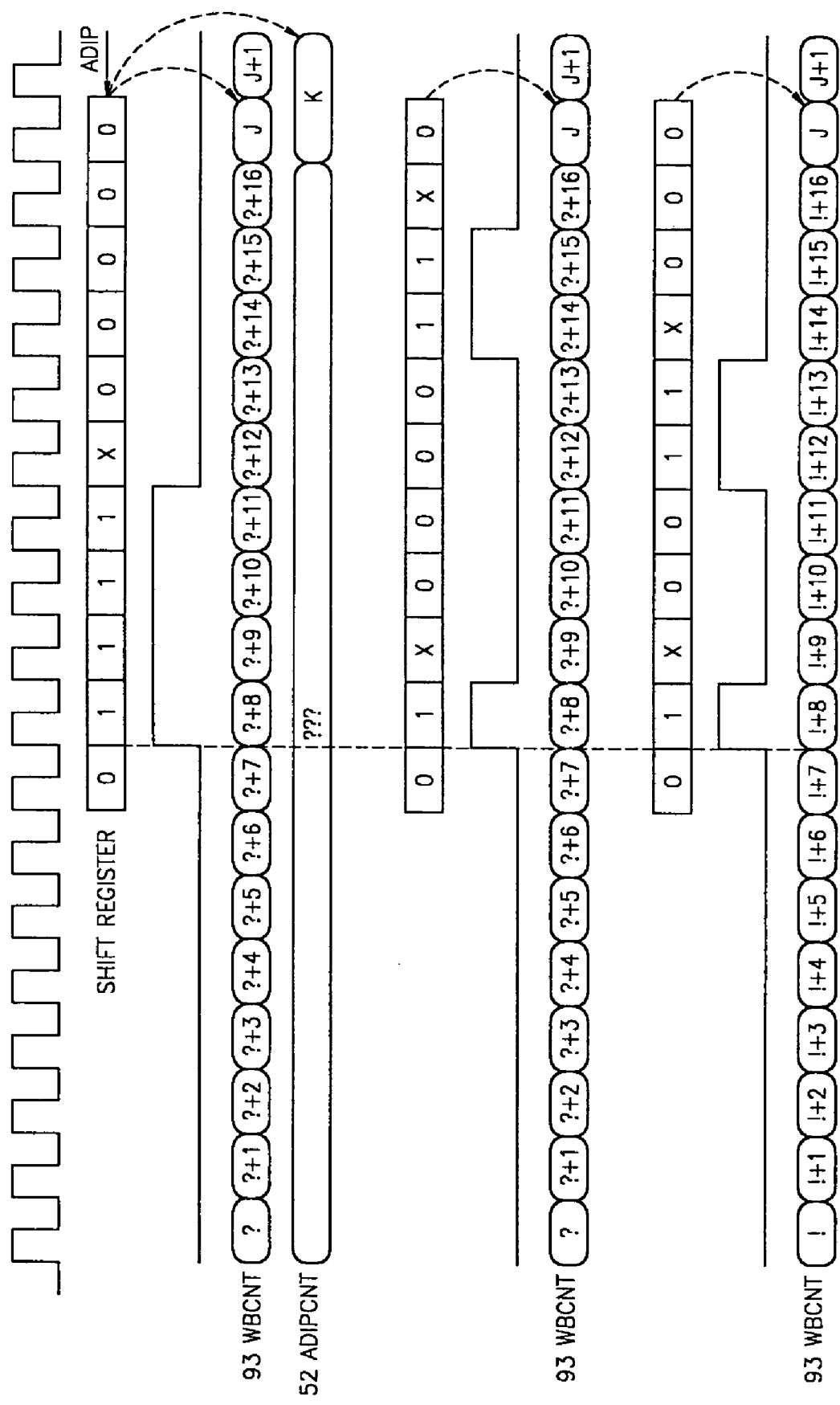
FIG. 6 is a timing diagram for detection of ADIP sync in a margin mode when ADIP word sync and ADIP bit sync are unlocked.

FIG. 5 is a timing diagram for detection of ADIP sync in the normal mode, when ADIP word sync and ADIP bit sync are unlocked, and FIG. 6 is a timing diagram for detection of ADIP sync in the margin mode, when ADIP word sync and ADIP bit sync are unlocked. Hereinafter, the operation of detecting ADIP sync in the normal mode and the margin mode when ADIP word sync is unlocked will be described with reference to FIGS. 3, 5, 6, and Table 1.

As shown in FIGS. 5 and 6, if ADIP data having patterns according to Table 1 is input to the shift register 51 and corresponding detection patterns are generated, the raw bit sync detecting unit 52 generates a raw bit sync signal RAW_BIT_SYNC corresponding to the generated detection patterns according to a predetermined ADIP detection mode.

At this time, when both ADIP bit sync and ADIP word sync are unlocked, the bit sync window BIT_SYNC_WIN is released in response to the previous bit sync unlocked state and a count value 93WBCNT of the wobble counter 54 is set to an ideal location J (e.g., 10) of ADIP bit sync based on the detected raw-bit-sync. The count value 93WBCNT of the wobble counter 54 can vary with a system design.

The bit sync consecutiveness determining unit 55 determines whether raw-bit-sync is detected based on values set by the bit sync lock setting unit 56 and the bit sync unlock setting unit 57 and generates the bit sync lock signal BIT_SYNC_LOCK or the bit sync unlock signal BIT_SYNC_UNLOCK to a status register, according to the result of the detection.

More specifically, the bit sync consecutiveness determining unit 55 receives the raw bit sync signal RAW_BIT_SYNC generated by the raw bit sync detecting unit 52 and determines whether raw-bit-sync is detected within the bit sync window BIT_SYNC_WIN having the first predetermined period the first predetermined number of consecutive times. If raw-bit-sync is detected the first predetermined number of consecutive times, it is determined that ADIP bit sync is accurately detected, and the bit sync lock signal BIT_SYNC_LOCK is generated. The bit sync lock signal BIT_SYNC_LOCK generated by the bit sync consecutiveness determining unit 55 sets the status register to a predetermined value. In addition, the bit sync consecutiveness determining unit 55 receives the raw bit sync signal RAW_BIT_SYNC generated by the raw bit sync detecting unit 52 and determines whether non-raw-bit-sync is detected within the bit sync window BIT_SYNC_WIN the second predetermined number of consecutive times. If non-raw-bit-sync is detected the second predetermined number of consecutive times, it is determined that ADIP bit sync is not accurately detected, and the bit sync unlock signal BIT_SYNC_UNLOCK is generated. And if non-raw-bit-sync is detected the second predetermined number of consecutive times, the ADIP bit sync locked state is maintained. The bit sync unlock signal BIT_SYNC_UNLOCK generated by the bit sync consecutiveness determining unit 55 sets the status register to a predetermined value. After ADIP bit sync is detected, ADIP word sync is detected as follows.

When ADIP word sync is unlocked, ADIP data according to Table 1 is input to the shift register 51. Thus, if the ADIP sync detection pattern, i.e., 0111 1000 000, is detected in the normal mode or the ADIP sync detection pattern, i.e., 0111 1X00 000, is detected in the margin mode, the raw word sync detection unit 62 generates the raw word sync signal RAW_WORD_SYNC corresponding to the detected ADIP sync detection patterns according to the predetermined ADIP detection mode.

Because the word sync window has already been released according to the previous word sync unlocking state, the count value 93WBCNT of the wobble counter 54 and a count value 52ADIPCNT of the ADIP counter 64 are set to the ideal locations J (e.g., 10) and K (e.g., 0) of word sync, respectively, according to the detected raw-word-sync. The count values 93WBCNT and 52ADIPCNT can vary with a system design.

The word sync consecutiveness determining unit 65 determines whether raw-word-sync is detected based on values (e.g., the number of raw-word-sync) that are set by the word sync lock setting unit 66 and the word sync unlock setting unit 67, respectively, and generates the word sync lock signal WORD_SYNC_LOCK or the word sync unlock signal WORD_SYNC_UNLOCK which is output to the status register.

More specifically, the word sync consecutiveness determining unit 65 receives the raw word sync signal RAW_WORD_SYNC generated by the raw word sync detection unit 62 and determines whether raw-word-sync is detected within the word sync window WORD_SYNC_WIN having the second predetermined period the first predetermined number of consecutive times. If raw-word-sync is detected the first predetermined number of consecutive times, it is determined that ADIP word sync is accurately detected, and the word sync lock signal WORD_SYNC_LOCK is generated. The word sync lock signal WORD_SYNC_LOCK generated by the word sync consecutiveness determining unit 65 sets the status register to a predetermined value. In addition, the word sync consecutiveness determining unit 65 receives the raw word sync signal RAW_WORD_SYNC generated by the raw word sync detection unit 62 and determines whether non-raw-word-sync is detected within the word sync window WORD_SYNC_WIN the second predetermined number of consecutive times. If non-raw-word-sync is detected the second predetermined number of consecutive times, the ADIP word sync locked state is maintained. And if non-raw-word-sync is detected the second predetermined number of consecutive times, it is determined that ADIP word sync is not accurately detected, and the word sync unlock signal WORD_SYNC_UNLOCK is generated. The word sync unlock signal WORD_SYNC_UNLOCK generated by the word sync consecutiveness determining unit 65 sets the status register to a predetermined value.

When ADIP bit sync is locked and ADIP word sync is unlocked, ADIP data according to Table 1 is input to the shift register 51 and corresponding detection patterns are generated. Then, the raw bit sync detecting unit 52 generates the raw bit sync signal RAW_BIT_SYNC corresponding to the generated detection patterns according to the predetermined ADIP detection mode.

Once raw-bit-sync is detected by the raw bit sync detecting unit 52, the bit sync window BIT_SYNC_WIN adopts a bit sync window that is set by the previous ADIP bit sync locked state. Because the count value 93WBCNT of the wobble counter 54 is set to J (e.g., 10), the bit sync consecutiveness determining unit 55 determines raw-bit-sync that is detected when the count value 93WBCNT of the wobble counter 54 is J to be ADIP bit sync and maintains the ADIP bit sync locked state. When the count value 93WBCNT of the wobble counter 54 is not J, the detected raw-bit-sync is determined not to be ADIP bit sync. Here, the count value (e.g., J) of the wobble counter 54, which has already been determined, can vary with a system design.

When ADIP bit sync is locked and ADIP word sync is unlocked, ADIP data having patterns according to Table 1 is input to the shift register 51 and predetermined detection patterns (e.g., 0111 1000 000 in the normal mode and 0111 1X00 000 in the margin mode) are generated, the raw word sync detection unit 62 generates the raw word sync signal RAW_WORD_SYNC corresponding to the generated detection patterns according to a predetermined ADIP detection mode.

At this time, because ADIP bit sync is locked and ADIP word sync is unlocked, the word sync window WORD_SYNC_WIN does not adopt a word sync window that is set by the previous ADIP word sync locked state.

When the count value 93WBCNT of the wobble counter 54 is J (e.g., 10), the count value of the ADIP counter 64 is set to K (e.g., 0).

The word sync consecutiveness determining unit 65 determines whether ADIP word sync, which is detected when the count value 93WBCNT of the wobble counter 54 is J and the count value of the ADIP counter 64 is K, is detected within the word sync window having the second predetermined period the first predetermined number of consecutive times. If ADIP raw-word-sync is detected the first predetermined number of consecutive times, it is determined that ADIP word sync is locked, and the word sync lock signal WORD_SYNC_LOCK is generated. If ADIP non-raw-word-sync is detected the second predetermined number of consecutive times, it is determined that ADIP word sync is unlocked, and the word sync unlock signal WORD_SYNC_UNLOCK is generated.

Figure 7:
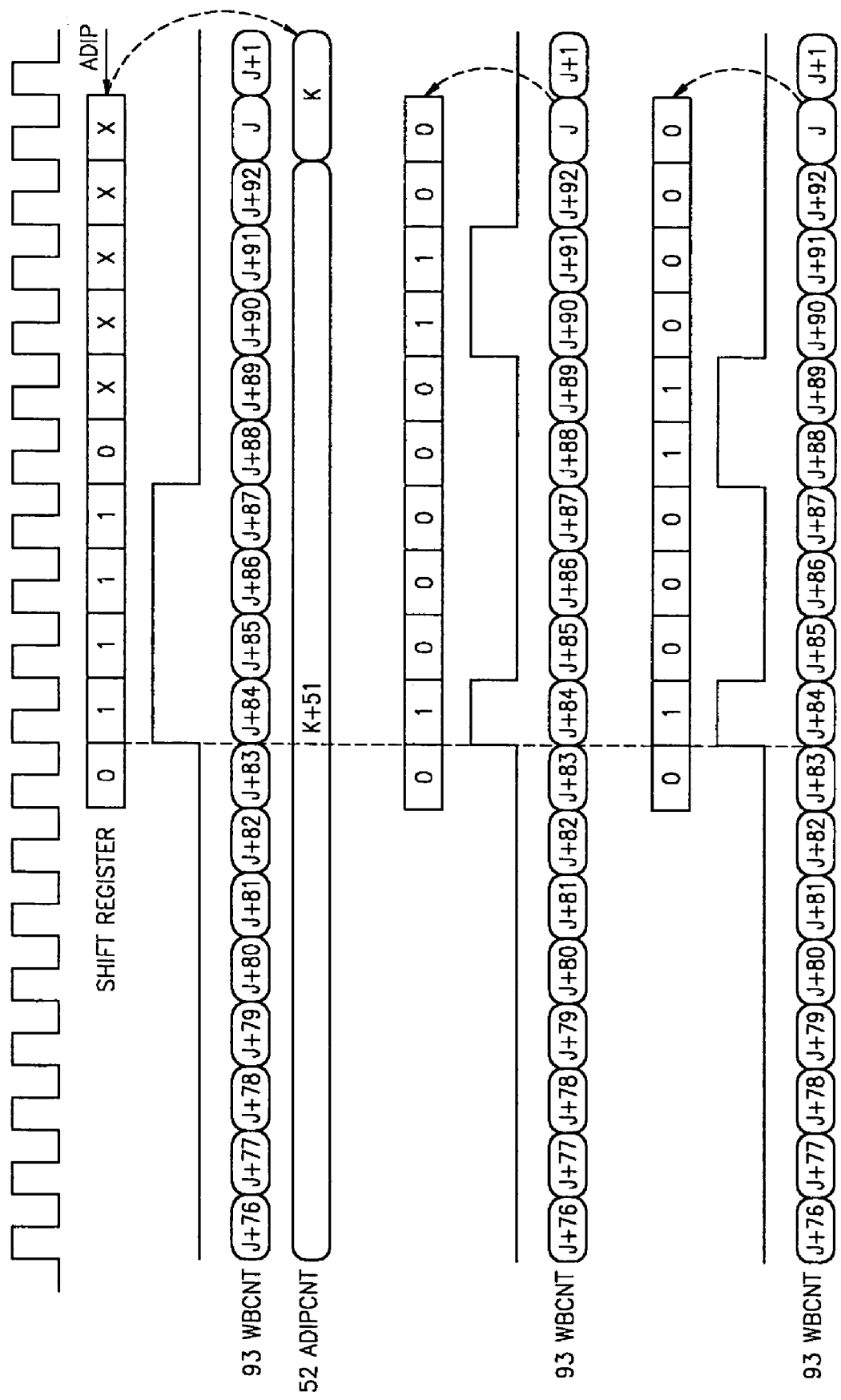
FIG. 7 is a timing diagram for detection of ADIP sync in the normal mode when ADIP word sync is locked.
Figure 8:
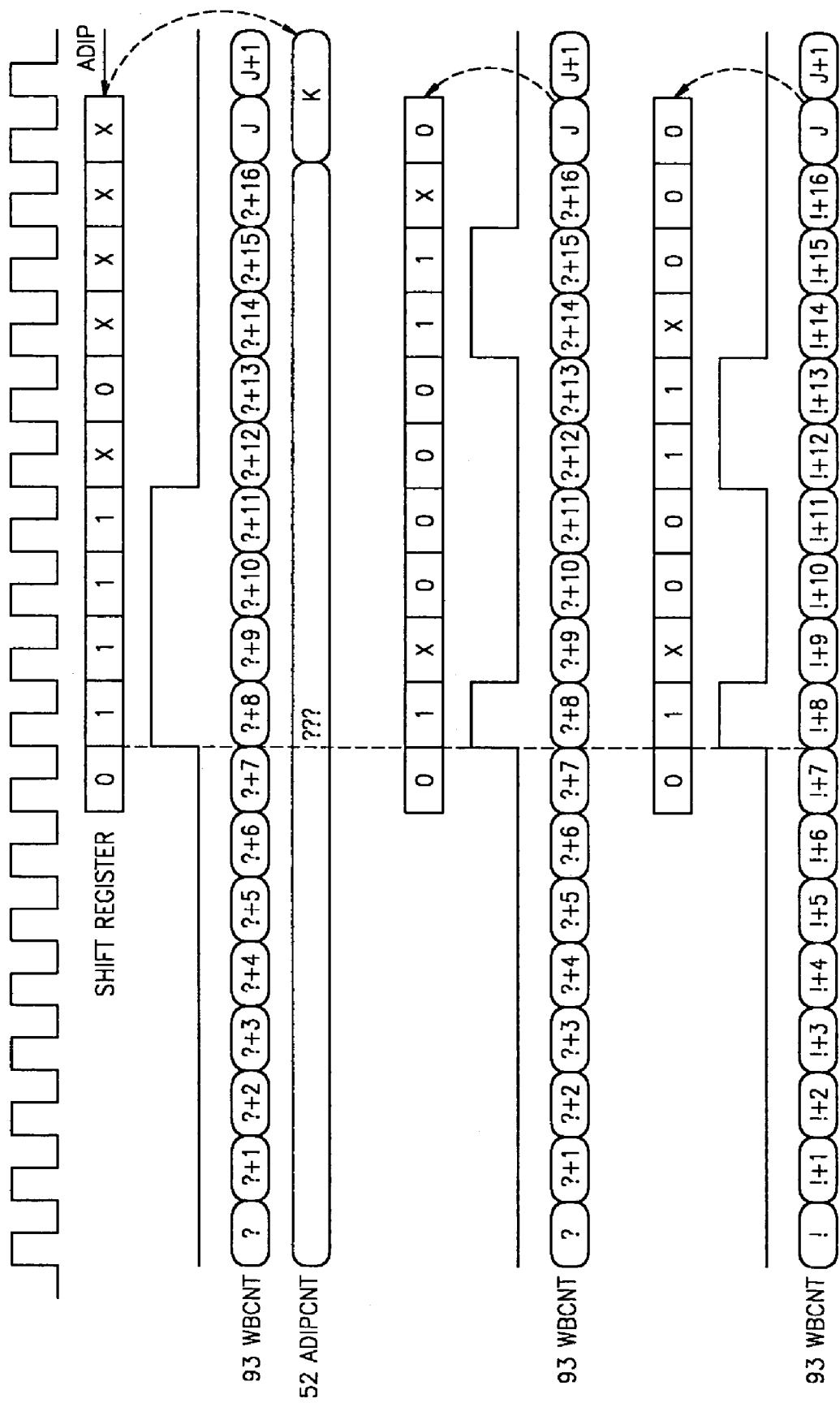
FIG. 8 is a timing diagram for detection of ADIP sync in the margin mode when ADIP word sync is locked.

FIG. 7 is a timing diagram for detection of ADIP sync in the normal mode when ADIP word sync is locked, and FIG. 8 is a timing diagram for detection of ADIP sync in the margin mode when ADIP word sync is locked. Hereinafter, the operation of detecting ADIP sync in the normal mode and the margin mode when ADIP word sync is locked will be described with reference to FIGS. 3, 7, 8, and Table 1. In this case, the operation of the bit sync detecting unit 50 is identical to when ADIP bit sync is locked. To avoid repetitive explanation, the description below focuses on the operation of the word sync detecting unit 60.

Referring to FIGS. 7 and 8, if ADIP data having patterns according to Table 1 is input to the shift register 51 and detection patterns (0111 10XX XXX in the normal mode or 0111 1X0X XXX in the margin mode) corresponding to ADIP word sync are generated, the raw word sync detection unit 62 generates the raw word sync signal RAW_WORD_SYNC corresponding to the generated detection patterns according to a predetermined ADIP detection mode.

If raw-word-sync is detected by the raw word sync detection unit 62, the previous ADIP word sync locked state is applied to the word sync window WORD_SYNC_WIN. If the count value 93WBCNT of the wobble counter 54 is set to J (e.g., 10) and the count value 52ADIPCNT of the ADIP counter 64 is set to K (e.g., 0), the word sync consecutiveness determining unit 65 determines raw-word-sync that is detected when the count value 93WBCNT of the wobble counter 54 is J and the count value 52ADIPCNT of the ADIP counter 64 is K to be ADIP word sync and maintains the ADIP word sync locked state. The word sync consecutiveness determining unit 65 determines raw-word-sync that is detected when the count value 93WBCNT of the wobble counter 54 is J but the count value 52ADIPCNT of the ADIP counter 64 is not K not to be ADIP word sync.

Figure 9A:
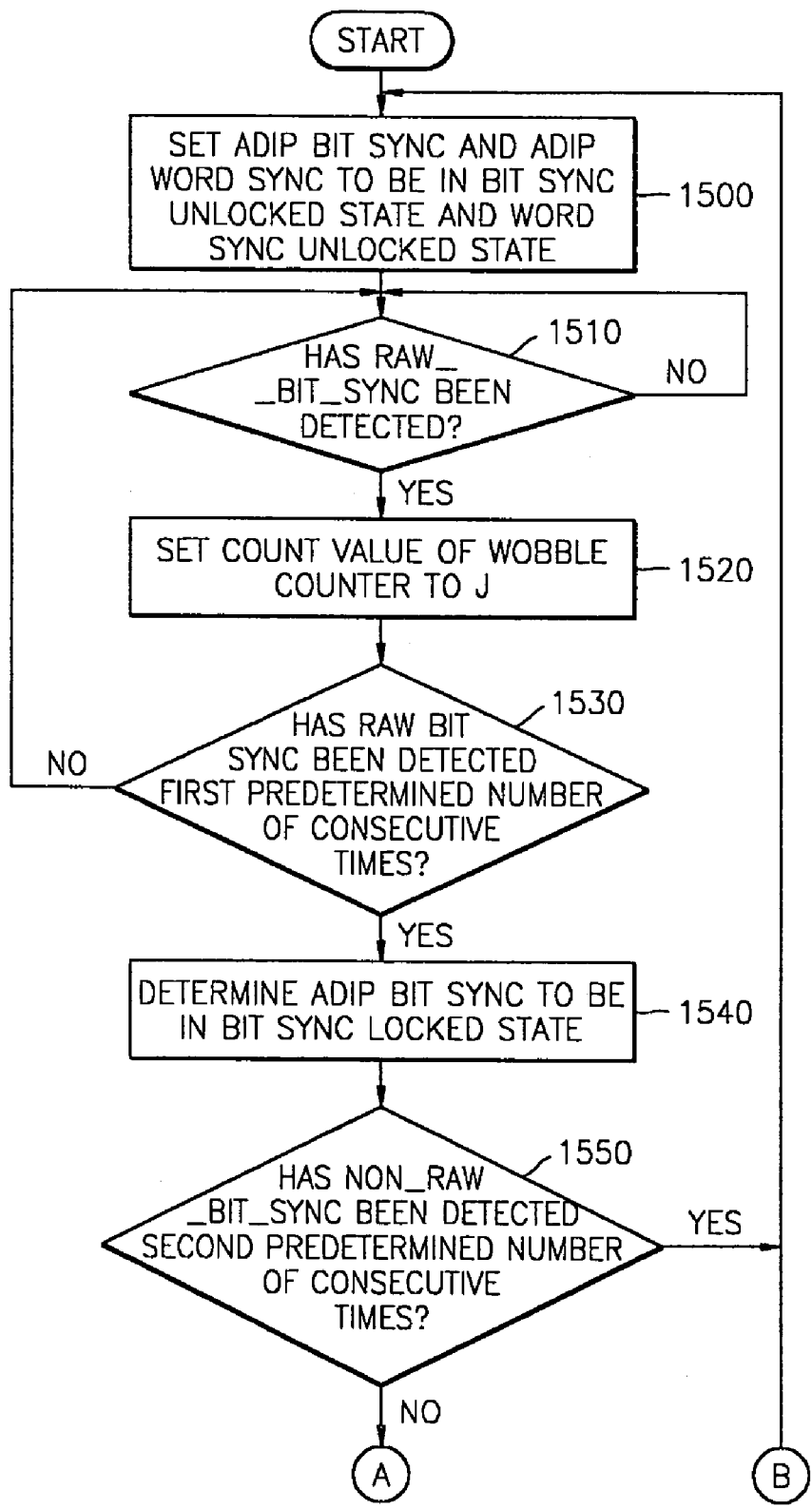
FIGS. 9A and 9B are flowcharts illustrating a method of detecting synchronization of ADIP of an optical storage device, according to an embodiment of the present invention.
Figure 9B:
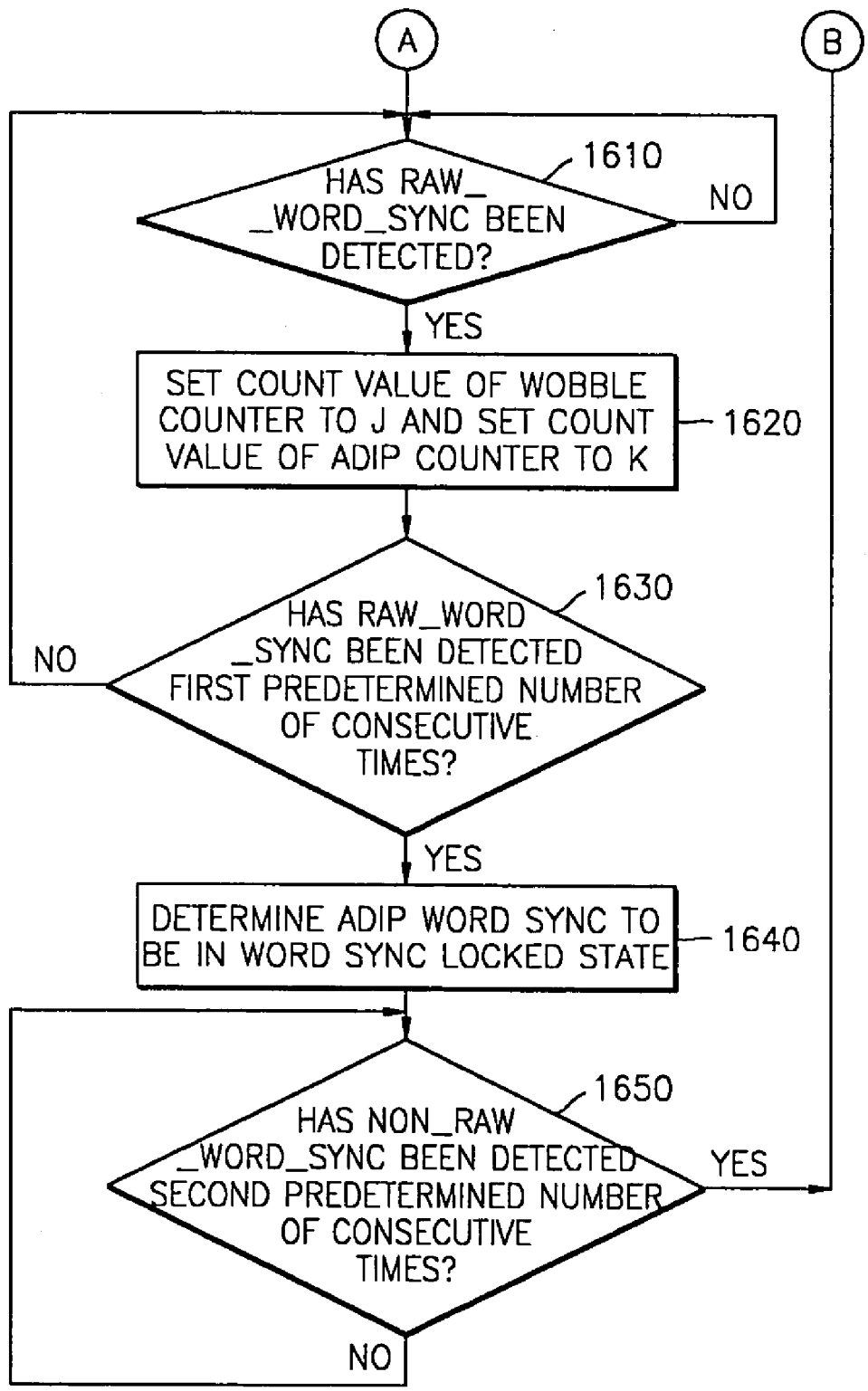

FIGS. 9A-9B are flowcharts illustrating a method of detecting ADIP sync of an optical storage device, according to an embodiment of the present invention. Referring to FIG. 9A, in operation 1500, the ADIP sync detector 100 sets ADIP bit sync and ADIP word sync to be in the bit sync unlocked state and in the word. sync unlocked state. In operation 1510, the ADIP sync detector 100 determines whether raw-bit-sync is detected. If raw-bit-sync is determined to be detected in operation 1510, the ADIP bit sync detecting unit 50 sets the count value 93WBCNT of the wobble counter 54 to the ideal location of ADIP bit sync J (e.g., 10) in operation 1520.

Next, in operation 1530, the bit sync consecutiveness determining unit 55 of the ADIP bit sync detecting unit 50 determines whether raw-bit-sync is detected the first predetermined number of consecutive times. If raw-bit-sync is determined to be detected the first predetermined number of consecutive times in operation 1530, the ADIP bit sync detecting unit 50 determines ADIP bit sync to be in the ADIP bit sync locked state in operation 1540. If raw-bit-sync is not detected the second predetermined number of consecutive times, a process returns to operation 1510.

If the state of the ADIP bit sync changes from the bit sync unlocked state to the ADIP bit sync locked state, the bit sync consecutiveness determining unit 55 of the ADIP bit sync detecting unit 50 determines whether non-raw-bit-sync is detected the second predetermined number of consecutive times in operation 1550.

If non-raw-bit-sync is detected the second predetermined number of consecutive times, the process returns to operation 1500 and resets the bit sync lock state into the bit sync unlock state. And if non-raw-bit-sync is determined not to be detected the second predetermined number of consecutive times, the raw word sync detection unit 62 of the ADIP word sync detecting unit 60 determines whether raw-word-sync is detected in operation 1610 of FIG. 9B. If raw-word-sync is determined to be detected the first predetermined number of consecutive times, the ADIP word sync detecting unit 60 sets the count value 93WBCNT of the wobble counter 54 to the ideal location of word sync J (e.g., 10) and sets the count value 52ADIPCNT of the ADIP counter 64 to K (e.g., 0) in operation 1620.

Thereafter, the word sync consecutiveness determining unit 65 of the ADIP word sync detecting unit 60 determines whether raw-word-sync is detected the first predetermined number of consecutive times in operation 1630. If raw-word-sync is determined to be detected the first predetermined number of consecutive times, the ADIP word sync detecting unit 60 determines word sync to be in the ADIP word sync locked state in operation 1640 of FIG. 9B. If raw-word-sync is determined not to be detected the second predetermined number of consecutive times, the process returns to operation 1610.

Once the state of the ADIP word sync changes from the word sync unlocked state changes to the ADIP word sync locked state, the word sync consecutiveness determining unit 65 of the ADIP word sync detecting unit 60 determines whether non-raw-word-sync is detected the second predetermined number of consecutive times in operation 1650. If non-raw-word-sync is detected the second predetermined number of consecutive times in operation 1650, the process returns to operation 1500 and resets the bit sync lock state into the bit sync unlock state and the word sync lock state into the word sync unlock state, respectively.

On the other hand, if non-raw-word-sync is not detected the second predetermined number of consecutive times in operation 1650, the ADIP word sync detecting unit 60 maintains the current word sync state.

As described above, the apparatus and method for detecting ADIP sync according to the present invention determines that ADIP bit sync and ADIP word sync are stably detected when raw-bit-sync and raw-word-sync are detected more than the first predetermined number of consecutive times. On the other hand, when non-raw-bit-sync and non-raw-word-sync are detected more than the second predetermined number of consecutive times, it is determined that ADIP bit sync and ADIP word sync are not detected normally, and ADIP bit sync and ADIP word sync are unlocked.

Also, raw-bit-sync that is detected outside the bit sync window is determined to be inaccurately detected as ADIP bit sync due to errors, and thus, such raw-bit-sync is not determined to be ADIP bit sync. Similarly, raw-word-sync that is not detected in the word sync window is determined to be inaccurately detected as ADIP word sync due to errors, and thus, such raw-word-sync is not determined to be ADIP word sync. As a result, the accuracy of detection of ADIP sync is improved and the probability of inaccurate detection is reduced.

In addition, the apparatus and method for detecting ADIP sync according to the present invention can use the margin mode having detection patterns that are more flexible than those of the normal mode, for the ADIP detection mode, thus increasing the probability of properly detecting ADIP sync.

According to the apparatus and method for detecting ADIP sync, it is possible to effectively detect ADIP sync that has been stored on a disc during manufacturing and to allow an optical storage device to write data onto an accurate location through accurate ADIP detection.

The present invention may be embodied as computer readable code stored in a computer readable recording medium. The computer readable recording medium may be a recording medium in which data that is readable by a computer system is stored. The computer readable recording medium includes, but is not limited to ROM, RAM, CD-ROM, magnetic tapes, hard disks, floppy disks, flash memory and optical data storage media. In addition, the computer readable recording medium may be distributed over the computer system connected via a network, and stored and implemented as a computer readable code using a distribution technique.

While the present invention has been particularly shown and described with reference to exemplary embodiments thereof, it will be understood by those of ordinary skill in the art that various changes in form and details may be made therein without departing from the spirit and scope of the invention as defined in the appended claims and their equivalents.

What is claimed is:

1. An apparatus detecting synchronization of address in pre-groove (ADIP), comprising:
   a bit synchronization detecting unit which determines synchronization of bits of the ADIP to be in a bit synchronization locked state when raw-bit-sync is detected a first predetermined number of consecutive times within a bit synchronization window having a first predetermined period; and
   a word synchronization detecting unit which determines synchronization of words of the ADIP to be in a word synchronization locked state when raw-word-sync is detected the first predetermined number of consecutive times within a word synchronization window having a second predetermined period.

2. The apparatus of claim 1, further comprising a detection mode setting unit which sets ADIP detection modes of the bit synchronization detecting unit and the word synchronization detecting unit to one of a normal mode and a margin mode, respectively.

3. The apparatus of claim 2, wherein the margin mode has detection patterns that are more flexible than those of the normal mode, so as to increase the probability of detecting synchronization of the ADIP.

4. The apparatus of claim 1, wherein the bit synchronization detecting unit comprises:
   a raw bit synchronization detecting unit which detects raw-bit-sync;
   a bit synchronization consecutiveness determining unit which determines whether raw-bit-sync is detected the first predetermined number of consecutive times within the bit synchronization window and whether non-raw-bit-sync is detected a second predetermined number of consecutive times in the bit synchronization locked state; and
   a first counter which controls a location of the bit synchronization window.

5. The apparatus of claim 4, wherein the bit synchronization detecting unit determines synchronization of the bits of the ADIP to be in the bit synchronization locked state when raw-bit-sync is detected within the bit synchronization window the first predetermined number of consecutive times.

6. The apparatus of claim 5, wherein the bit synchronization consecutiveness determining unit changes the state of the synchronization of the bits of the ADIP from the bit synchronization locked state to a bit synchronization unlocked state when non-raw-bit-sync is detected in the bit synchronization locked state the second predetermined number of consecutive times.

7. The apparatus of claim 4, further comprising a bit synchronization lock setting unit which outputs a signal indicating the first predetermined number of consecutive times to the bit synchronization consecutiveness determining unit, wherein the first predetermined number of consecutive times is used in the bit synchronization consecutiveness determining unit to determine whether synchronization of the bits of the ADIP is in the bit synchronization locked state.

8. The apparatus of claim 4, further comprising a bit synchronization unlock selling unit which outputs a signal indicating the second predetermined number of consecutive times to the bit synchronization consecutiveness determining unit, wherein the second predetermined number of consecutive times is used in the bit synchronization consecutiveness determining unit to determine whether synchronization of the bits of the ADIP is in the bit synchronization unlocked state.

9. The apparatus of claim 4, wherein a count value of the first counter is set to an optimal value for detecting synchronization of the bits of the ADIP within the bit synchronization window during detection of the raw-bit-sync.

10. The apparatus of claim 1, wherein the word synchronization detecting unit comprises:
    a raw word synchronization detecting unit which detects raw-word-sync;
    a word synchronization consecutiveness determining unit, which determines whether the raw-word-sync is detected within the word synchronization window the first predetermined number of consecutive times and whether non-raw-word-sync is detected the second predetermined number of consecutive times in the word synchronization locked state; and
    a second counter which controls a location of the word synchronization window.

11. The apparatus of claim 10, wherein the word synchronization detecting unit determines synchronization of the words of the ADIP to be in the word synchronization locked state when the raw-word-sync is detected within the word synchronization window the first predetermined number of consecutive times.

12. The apparatus of claim 11, wherein the word synchronization consecutiveness determining unit changes the state of the synchronization of the words of the ADIP from the word synchronization locked state to a word synchronization unlocked state when the non-raw-word-sync is detected in the word synchronization locked state the second predetermined number of consecutive times.

13. The apparatus of claim 10, further comprising a word synchronization lock setting unit which outputs a signal indicating the first predetermined number of consecutive times to the word synchronization consecutiveness determining unit, wherein the first predetermined number of consecutive times is used for the word synchronization consecutiveness determining unit to determine whether synchronization of the words of the ADIP is in the word synchronization locked state.

14. The apparatus of claim 10, further comprising a word synchronization unlock setting unit which outputs a signal indicating the second predetermined number of consecutive times to the word synchronization consecutiveness determining unit, wherein the second predetermined number of consecutive times is used in the word synchronization consecutiveness determining unit to determine whether synchronization of the words of the ADIP is in the word synchronization unlocked state.

15. The apparatus of claim 10, wherein a count value of a first counter is set to an optimal value for detecting synchronization of the words of the ADIP within the word synchronization window during detection of the raw-word-sync.

16. The apparatus of claim 10, wherein a count value of the second counter is set to an optimal value for detecting synchronization of the words of the ADIP within the word synchronization window during detection of the raw-word-sync.

17. A method of detecting synchronization of address in pre-groove (ADIP), comprising:
  determining synchronization of bits of the ADIP to be in a bit synchronization locked state when raw-bit-sync is detected within a bit synchronization window having a first predetermined period a first predetermined number of consecutive times; and
  determining synchronization of words of the ADIP to be in a word synchronization locked state when raw-word-sync is detected within a word synchronization window having a second predetermined period the first predetermined number of consecutive times when synchronization of the bits of the ADIP is in the bit synchronization locked state.

18. The method of claim 17, wherein the determining synchronization of bits of the ADIP, comprises:
  detecting the raw-bit-sync;
  setting a count value of a first counter that controls a location of the bit synchronization window to a predetermined value during detection of the raw-bit-sync;
  determining synchronization of the bits of the ADIP to be in the bit synchronization locked state when the raw-bit-sync is detected within the bit synchronization window the first predetermined number of consecutive times; and
  changing the state of the synchronization of the bits of the ADIP from the bit synchronization locked state to a bit synchronization unlocked state when non-raw-bit-sync is detected in the bit synchronization locked state a second predetermined number of consecutive times.

19. The method of claim 18, wherein the count value of the first counter is set to an optimal value for detecting synchronization of the bits of the ADIP within the bit synchronization window during detection of the raw-bit-sync.

20. The method of claim 17, wherein the determining synchronization of words of the ADIP comprises:
  detecting the raw-word-sync;
  setting a count value of a second counter that controls a location of the word synchronization window to a predetermined value during detection of the raw-word-sync;
  determining synchronization of the words of the ADIP to be in a word synchronization locked state when the raw-word-sync is detected within the word synchronization window the first predetermined number of consecutive times; and
  changing the state of the synchronization of the words of the ADIP from the word synchronization locked state to the word synchronization unlocked state when non-raw-word-sync is detected in the word synchronization locked state a second predetermined number of consecutive times.

21. The method of claim 20, wherein the count value of a first counter is set to an optimal value for detecting synchronization of the words of the ADIP within the word synchronization window during detection of the raw-word-sync.

22. The method of claim 20, wherein the count value of a second counter is set to an optimal value for detecting synchronization of the words of the ADIP within the word synchronization window during detection of the raw-word-sync.

23. A method of detecting synchronization of address in pre-groove (ADIP), comprising:
  detecting raw-bit-sync of bits of the ADIP;
  setting a count value of a first counter, which controls a location of a bit synchronization window, to a predetermined value during detection of the raw-bit-sync;
  determining synchronization of the bits of the ADIP to be in a bit synchronization locked state when the raw-bit-sync is detected within the bit synchronization window a first predetermined number of consecutive times;
  changing the bit synchronization locked state to a bit synchronization unlocked state when non-raw-bit-sync is detected in the bit synchronization locked state a second predetermined number of consecutive times;
  detecting raw-word-sync of words of the ADIP in the bit synchronization locked state;
  during detection of the raw-word-sync, setting the count value of the first counter and a count value of a second counter, which are used to control a location of a word synchronization window, to predetermined values;
  determining synchronization of the bits of the ADIP to be in the bit synchronization locked state and synchronization of the words of the ADIP to be in the word synchronization locked state when the raw-word-sync is detected within the word synchronization window in the bit synchronization locked state the first predetermined number of consecutive times; and
  changing the state of the synchronization of the words of the ADIP from the word synchronization locked state to a word synchronization unlocked state and changing the state of the synchronization of the bits of the ADIP from the bit synchronization locked state to the bit synchronization unlocked state when non-raw-word-sync is detected in the word synchronization locked state the second predetermined number of consecutive times.

24. The method of claim 23, wherein the count value of the first counter is set to an optimal value for detecting synchronization of the bits of the ADIP within the bit synchronization window during detection of the raw-bit-sync.

25. The method of claim 23, wherein the count value of the first counter is set to an optimal value for detecting synchronization of the words of the ADIP within the word synchronization window during detection of the raw-word-sync.

26. The method of claim 23, wherein the count value of the second counter is set to an optimal value for detecting synchronization of the words of the ADIP within the word synchronization window during detection of the raw-word-sync.

27. A computer readable recording medium having embodied therein a computer program of a method detecting synchronization of address in pre-groove (ADIP), comprising:
determining synchronization of bits of the ADIP to be in a bit synchronization locked state when raw-bit-sync is detected within a bit synchronization window having a first predetermined period a first predetermined number of consecutive times; and
determining synchronization of words of the ADIP to be in a word synchronization locked state when raw-word-sync is detected within a word synchronization window having a second predetermined period the first predetermined number of consecutive times, when synchronization of the bits of the ADIP is in the bit synchronization locked state.

28. A computer readable recording medium having embodied therein a computer program of a method of detecting synchronization of address in pre-groove (ADIP), the method comprising:
detecting raw-bit-sync of bits of the ADIP;
setting a count value of a first counter, which controls a location of a bit synchronization window, to a predetermined value during detection of the raw-bit-sync;
determining synchronization of the bits of the ADIP to be in a bit synchronization locked state when raw-bit-sync is detected within the bit synchronization window a first predetermined number of consecutive times;
changing the bit synchronization locked state to a bit synchronization unlocked state when non-raw-bit-sync is detected in the bit synchronization locked state a second predetermined number of consecutive times;
detecting raw-word-sync of words of the ADIP in the bit synchronization locked state;
during detection of the raw-word-sync, setting the count value of the first counter and a count value of a second counter, which are used to control a location of a word synchronization window, to predetermined values;
determining synchronization of the bits of the ADIP to be in the bit synchronization locked state and synchronization of the words of the ADIP to be in the word synchronization locked state when raw-word-sync is detected within the word synchronization window in the bit synchronization locked state the first predetermined number of consecutive times; and
changing the state of the synchronization of the words of the ADIP from the word synchronization locked state to a word synchronization unlocked state and changing the state of the synchronization of the bits of the ADIP from the bit synchronization locked state to the bit synchronization unlocked state when non-raw-word-sync is detected in the word synchronization locked state the second predetermined number of consecutive times.

29. An optical disc drive signal processor, comprising:
a motor to rotate an optical disc in the optical disc drive;
an optical pickup to read/write to the optical disc with an optical pickup lens, wherein the optical pickup outputs signals corresponding to the data on the optical disc;
a wobble phase locked loop (PLL) and address in pre-groove (ADIP) detector to generate an ADIP signal based on the signals output from the optical pickup;
an ADIP bit sync detector which receives the ADIP signal from the wobble PLL and ADIP detector, wherein the ADIP bit sync detector identifies an ADIP bit sync in the ADIP signal and outputs a raw-bit-sync signal in response to each identified ADIP bit sync; and
an ADIP word sync detector which receives the ADIP signal from the wobble PLL and ADIP detector and which identifies an ADIP word sync in the ADIP signal based on the raw-bit-sync signal, wherein bit synchronization and word synchronization are set to a locked state in a status register when a predetermined number of consecutive raw-bit-sync and raw-word-sync signals have been output, respectively.

30. The processor of claim 29, further comprising:
an ADIP detection mode setter, wherein predetermined synchronization mode detection patterns are set corresponding to the ADIP bit sync and ADIP word sync, respectively.

31. The processor of claim 30, wherein the synchronization mode detection patterns are selected from a plurality of predetermined synchronization mode detection patterns corresponding to bit synchronization and word synchronization, respectively.

32. The processor of claim 30, further comprising:
a window setter which sets a predetermined bit sync window and a predetermined word sync window, wherein when the ADIP bit sync detector identifies ADIP bit sync in the bit sync window, a raw-bit-sync signal is output, and when the ADIP word sync detector identifies ADIP word sync in the word sync window, a raw-word-sync signal is output.

33. The processor of claim 32, wherein when the predetermined number of consecutive raw-bit-sync signals are not output, a bit sync unlock signal is output to the status register.

34. The processor of claim 32, wherein when a non-raw-bit-sync is identified a second predetermined number of times consecutively, a bit sync unlock signal is output to the status register.

35. The processor of claim 32, wherein when the predetermined number of consecutive raw-word-sync signals are not output, a word sync unlock signal is output to the status register.

36. The processor of claim 32, wherein when a non-raw-word-sync is identified a second predetermined number of times consecutively, a word sync unlock signal is output to the status register.

37. The processor of claim 32, wherein when the ADIP bit sync is identified outside the bit sync window then raw-bit-sync signal is determined to be an error and is disregarded.

38. The processor of claim 32, wherein when the ADIP word sync is identified outside the word sync window then raw-word-sync is determined to be an error and is disregarded.

* * * * *

UNITED STATES PATENT AND TRADEMARK OFFICE
CERTIFICATE OF CORRECTION

PATENT NO. : 7,286,452 B2
APPLICATION NO. : 10/771502
DATED : October 23, 2007
INVENTOR(S) : Woo-Sik Eom It is certified that error appears in the above-identified patent and that said Letters Patent is hereby corrected as shown below:

Column 12, Line 29, change "selling" to --setting--.

Signed and Sealed this

Fourth Day of March, 2008

JON W. DUDAS
*Director of the United States Patent and Trademark Office*